(12) United States Patent
Modrak

(10) Patent No.: US 6,221,428 B1
(45) Date of Patent: Apr. 24, 2001

(54) FIBERIZED ASPHALT HOT MIX COMPOSITION AND METHOD FOR IMPROVING DURABILITY AND LIFE OF ASPHALT PAVED SURFACES

(75) Inventor: James P. Modrak, Conyers, GA (US)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 09/648,350

(22) Filed: Aug. 25, 2000

Related U.S. Application Data

(63) Continuation of application No. 07/459,841, filed on Jan. 2, 1990, now abandoned, which is a continuation of application No. 08/109,842, filed on Aug. 17, 1993, now abandoned.

(51) Int. Cl.$^7$ ........................................... B05D 5/10
(52) U.S. Cl. ........................... 427/138; 427/139; 428/373
(58) Field of Search ............................... 524/59; 427/138, 427/139; 428/373

(56) References Cited

U.S. PATENT DOCUMENTS 4,492,781 * 1/1985 Duszak et al. ........................ 524/59

OTHER PUBLICATIONS

"The Use of Bicomponent Fiber for Thermally Bonding Air Laid Structures and Some Specific Product Applications" Tomioka et al., May 1981.*

* cited by examiner

Primary Examiner—Peter D. Mulcahy
(74) Attorney, Agent, or Firm—David Edwards

(57) ABSTRACT

A fiberized asphalt-type composition and method for increasing the structural stability and durability of fiber-reinforced asphalt-type surfaces without increasing concentration or length of fiber, by addition of an active amount of a special class of bicomponent fibers.

17 Claims, No Drawings

FIBERIZED ASPHALT HOT MIX COMPOSITION AND METHOD FOR IMPROVING DURABILITY AND LIFE OF ASPHALT PAVED SURFACES

This application is a continuation of application Ser. No. 07/459,841, filed Jan. 2, 1990, now abandoned, which is a continuation of application serial number 08/109,842, filed Aug. 17, 1993 now abandoned.

BACKGROUND OF THE INVENTION

This invention relates to fiber-reinforced asphalt-type overlay compositions capable of providing surfaces of improved durability, and to a method for obtaining such durability while maintaining acceptable lay down and workability characteristics.

A substantial number of existing highways are paved or faced with asphalt-type compositions containing various aggregates such as gravel, crushed stone, sand and the like. Moreover, additional miles of road are built each year in which asphalt-type compositions serve as a major component. The continued widespread use of such material, however, depends, to a great extent, upon initial cost, durability, and the amount and cost of maintenance.

Asphalt-type compositions of the more recent types frequently contain fiber reinforcing component(s) such as various concentrations of polyolefin-type fiber(s) within asphalt, asphalt/rubber, rubber, or acrylic copolymer-asphalt/acrylic copolymer-type compositions, and the like, which are compatible with existing lay-down and one or more working steps (i.e. spreading, rolling and curing) techniques and equipment.

In general, when surfacing or overlay steps are being carried out, either hot mix or emulsified asphalt-type compositions are applied respectively (1) as filler for underlying cracks, (2) as a waterproof layer between old and new paving surfaces, and (3) as an external surfacing material. In order to serve such needs, however, the amount and fineness of aggregate, the concentration and/or presence of a fiber reinforcing component, and the use of various art-recognized additives such as blending and curing agents etc. (ref. U.S. Pat. No. 4,492,781) can correspondingly vary.

In general, however, overlay compositions suitable for the above-indicated purposes must be capable of providing a high degree of durability, flexibility and shear resistance. It is also very useful and desirable, as a commercial goal, that overlay compositions be applicable within as wide a range of temperature conditions as possible, and be easily, worked.

It is commonly accepted that durability and shear resistant properties can be improved, under existing technology, by the inclusion of relatively small amounts of reinforcing fiber staple component such as wire, fiberglass, asbestos, and particularly synthetic polymeric material within the overlay composition.

Particularly preferred synthetic staple fibers for such purpose, are polyolefin fibers such as polypropylene and polyethylene fiber, because of their general compatibility with asphalt and asphalt-type compositions. Such reinforcing fiber components are generally added as short staple and customarily vary in concentration from about 0.10 to about 10 weight percent, and preferably in an amount of about 0.25–8.0 weight percent based on solids.

Length-wise, such "short staple" reinforcing fiber component(s) normally vary from about ¼" to about ¾", depending upon the intended purpose of the overlay and the method of application.

For example, when high-performance surfaces such as highways, airfields, tennis courts and the like are being repaired, it is advantageous to obtain-as high a degree of fiber comingling and interlocking as possible, the practical upper limit being about ¾" fiber length and within a mid range of the above-indicated conventional concentrations. The addition of longer staple or higher concentrations, particularly synthetic hydrophobic fiber material such as polypropylene, usually results in adverse pumpability and fiber clumping. Moreover, fiber-reinforced asphalt-type overlay compositions, as above described customarily require at least a 10° C. higher temperature than the usual 284° F.–310° F. (140°–155° C.) range, in order to maintain a workable lay-down viscosity or temperature window in the field. Such increased temperature is conventionally difficult to control (i.e. hot spots) and likely to result in at least some degradation of conventional monocomponent hydrophobic reinforcing fibers.

It is an object of the present invention to improve the structural stability and durability of asphalt-type overlays formed using asphalt-type overlay compositions, while continuing to enjoy the benefits of hydrophobic polyolefin-type reinforcing fiber and without resorting to increased staple length or higher-than-normal concentrations of the fiber.

It is a further object of the present invention to achieve such improvement without creating additional problems with respect to lay down and workability of fiber-reinforced overlay compositions.

It is still a further object of the present invention to avoid fiber clumping and increase structural stability of asphalt-, asphalt/rubber-, rubber-, acrylic copolymer-, and asphalt/acrylic copolymer-containing overlay composition surfaces and to permit more effective use of reinforcing fiber material, particularly polymeric polyolefin-type staple fiber such as polypropylene fiber.

THE INVENTION

The above objects are achieved in accordance with the instant invention, whereby structural stability and durability of an asphalt-type overlay is substantially increased without the need for increasing normal staple length or concentration of fiber reinforcing components, by (a) applying an effective amount of the following-described overlay composition onto a desired substrate or base, and (b) heating and working the composition coincident with and/or subsequent to step "(a)", to favor softening or melting and migration of the sheath component over the core of bicomponent reinforcing fiber of such defined overlay composition to form clumps or beads.

For present purposes temperatures employed in the heating and working step, as described, may effectively exceed the melting or softening point of the sheath component either before (by general heating) or after (by heated roller, mandrel or the like) lay down of the overlay composition onto a desired substrate or base, provided the temperature during such heating and working step is kept below the melting or softening point of the corresponding higher melting core component(s) of reinforcing fiber.

For present purposes the term "overlay composition" comprises, in combination:

A. a base component of an asphalt-type material, such material comprising, for instance, one or more of (1) asphalt, (2) asphalt/rubber, (3) rubber, (4) acrylic copolymer, and (5) asphalt/acrylic copolymer, preferably in respective ratios of about 100-10/0-90/0-90/0-90/0-90 parts by weight;

B. up to about 10 weight percent (and preferably 0–1.5 weight percent) of a water-soluble polymer material, such material exemplified by one or more of a carboxymethyl cellulose, such as the sodium or calcium salt, a carboxymethyl hydroxyethyl cellulose, or hydroxypropyl, hydroxyethyl cellulose of the types described, for instance, in U.S. Pat. No. 4,492,781.

C. About 0.25–10 weight percent by weight of base component (based on solids) of reinforcing fiber component, about 25%–100 by weight of which is in the form of side-by-side or sheath/core-type bicomponent fiber comprising (1) a polyolefin-containing sheath component and inclusive of a crystalline homopolymer or copolymer of propylene and (2) a which is wettable by a polyolefin core component, the later having a higher softening and melting point than the sheath component; included within such core component is fiber obtained using spun melt comprising polypropylene or polyethylene together with maleic anhydride; also included is a polyolefin sheath/core arrangement such as a polypropylene core and a polyethylene sheath;

D. up to about 3000 weight percent aggregate material (fine, mixed or coarse) by weight of base component;

E. up to about 5 weight percent of a curing and thickening agent by weight of base component; included within a class of such agent(s) is one or more of Portland Cement, diatomaceous silica, lime and alum;

F. up to about 100 weight percent of a rosin ester material by weight of base component, as hereafter listed and described.

By way of further definition the term "asphalt" as used in "asphalt-type material", conventionally includes bituminous substances generally, such as natural- or petroleum-refiner asphalts, asphaltites, pyrogenous distillates, bottom stock, as well as other pyrogenous residues such as pyrogenous asphalts, petroleum pitch, coal tar pitch and mixtures thereof. Such material is often characterized by a penetration value of from 0–300 or higher (ASTM D-5-51), preferably about 40–300, with a softening point in the range of about 90°–250° F. (ASTM D-36-26), preferably between 100°–150° F.

Suitable base components, for present purposes, also comprise materials listed in Column 3 of U.S. Pat. No. 2,478,162 of Sommers and in Column 2 of U.S. Pat. No. 3,738,853 of Kopvillem et al.

Also included as a base component are aphalt-to-latex copolymers (preferably 100–70 to 0–30 parts by weight) of styrene and butyl acrylate which are obtainable commercially, for instance, as Rohm & Haas EL 805*[1], used alone or combined with hydrogenated rosin esters such as FORAL®85. Also commercially available and of interest, for purposes of the above invention, are cured latex materials such as PolySar®298, which can be combined with about 99–70 weight percent asphalt to form base component. Of further interest, for purposes of the present invention, are nonlatex-type materials such as acrylic copolymers, preferably in combination with comparable amounts of asphalt and/or rubber material with a reinforcing amount of fiber material inclusive of crystalline polypropylene.

*[1] Trademark of Rohm and Hass Corporation.

Acrylic copolymer material, as described above, is further exemplified, for present purposes, as a 90–75 to 10–25 ratio by weight of ethylene/acrylic acid copolymers. Dow PE490® ethylene/acrylic acid copolymer is another suitable commercially available base component of this general type.

Acrylic copolymers, as above defined, are usefully employed in combination with asphalt, polypropylene fiber, water-soluble polymer, fines, and aggregate as set out, to obtain a tough but somewhat less flexible surface than straight fiber-reinforced rubber/asphalt base material. Both, however, are satisfactory for purposes of the present invention when utilized within the required parameters.

As above noted, the amount of reinforcing fiber (component C) employed can usefully vary from about 0.10–12 weight percent reinforcing fiber (0.25–0.75 weight % preferred for slurry seal and 3–12 weight % for crack sealant), about 25%–100% by weight of which can be in the form of a side-by-side and/or bicomponent sheath/core-type fiber having a polyolefin sheath component and a polyolefin-wettable core component having a higher softening and melting point than the sheath component that is, the core can be wet by a polyolefin. Of particular interest, for present purposes, are sheath/core combinations such as polypropylene/polyester, polypropylene-maleic anhydride/polyester, polypropylene/polybutene, and polypropylene/polyethylene, in which the sheath is preferably, although not exclusively, crystalline homopolymer or a copolymer of propylene and ethylene. Such usefully includes polypropylene having a viscosity average molecular weight of about 140,000–280,000 or higher, the diameter of the resulting bicomponent or mono-component reinforcing fiber(s) being about 1–5 mil or higher, in which the difference in melting or softening points between sheath and core components can usefully vary from about 10° C.–50° C. or more, provided that the lower-melting sheath component retains its core-wetting properties within the entire temperature range.

As above noted, the amount and nature of aggregate material (D component) used depends upon the intended use of the overlay composition.

In the case of crack sealant compositions, for instance, an aggregate range of about 0–10 and preferably up to 7.5 weight percent of fine aggregate such as sand, (by weight of base component) along with other fines, is found sufficient. This component can also serve as a supplemental thickening agent as well as promoting durability of the resulting surface.

Where the overlay composition is utilized as a slurry seal, on the other hand, a much higher aggregate concentration range (500–3000 weight percent of medium-to-heavy aggregate) is preferred, depending also on the method of application and temperature desired.

Use of aggregate as Chip Seal, on the other hand, requires a range of about 50–3000 weight percent, and preferably a concentration of about 100 weight percent of mixed aggregate, all, or a substantial amount of which is applied "in situ".

Generally speaking, such aggregate materials include clean, dry material ranging from about #4 to #200 sieve size, which is blended to conform to 1SSA type II gradations.

Also optionally included within overlay compositions of the present invention are curing and thickening agent(s) (Component E), preferably in a range of about 0–5 weight percent.

Some degree of control over viscosity and curing time is effected by adding fines such as one or more of dicalite clay, Portland cement, lime and alum. These, in concentrations of about 0–5 weight percent, and particularly 0.5–2.0 weight percent, are frequently used with the above-defined base component. Again, however, the presence and choice of such curing and thickening agents in conjunction with a base component depends substantially upon the amount and nature of base component(s) used, and the intended functional purpose of the resulting overlay surface. Where, for instance, sealing properties require a high concentration of rubber in the asphalt/rubber base component, it is preferred to employ a curing agent such as alum, Portland cement, or a combination of the two. Where, on the other hand, 85% or more of the base component is asphalt, then Portland cement alone is generally preferred. In the former situation, however, the time delay between addition of curing agent and lay down of the overlay composition should be minimized. Here again, the choice of base component(s), the amount of fiber and the compatibility of the water-soluble polymer material must be correlated in order to obtain an acceptable fiber-reinforced overlay composition.

Rosin ester material (Component F) preferably comprises a mixture of straight chain unsaturated fatty acids having up to about 100 weight percent rosin for minimizing characteristic losses in tensile strength and brittleness associated with a fiber reinforced overlay composition exposed to zero or sub-zero temperature conditions after lay down.

The above-modified straight chain unsaturated fatty acids usefully comprise mixtures of about 70–100% mono- and di-unsaturated fatty acids, the fatty acid component generally consisting of about 40–50% di-unsaturated acids. Such material is obtainable, for instance, by distillation of Tall Oil[2] as a by-product from sulfite pulping processes. The above rosin ester material is found to be especially useful when employed with asphalt or asphalt/rubber base components in a concentration range of about 0–2.5 weight percent, calculated by weight of base component, for slurry seal and chip seal purposes and up 0–5 weight percent for crack sealant purposes. Such "F" component materials are obtainable commercially[3] from Hercules Incorporated.

[2] Reference Hackh's Chemical Dictionary, 4th Ed., pg. 660 and Condensed Chemical Dictionary, 10th Ed., pg. 992.
[3] PAMAR® fatty acids and FORAL®85 rosin and rosin esters.

The present invention is further demonstrated in FIGS. 1–3 A–C, in which FIG. 1 schematically represents an idealized fragmented partial cross section of an overlay showing bicomponent staple reinforcing fiber (1) and a supplemental polyolefin-wettable monocomponent reinforcing fiber (2), aggregate particles (3) within a body of mixed overlay composition, in which the balance of the composition is undifferentiated and shown, in part, as cross hatch (4). The bicomponent fiber (1), as shown, is comprised of a sheath component (7) and a higher melting sheath-wettable core component (6), added sheath-wettable reinforcing fiber (2) (optional) and aggregate component (3), the components not being shown to scale.

FIG. 2 schematically represents the corresponding heat-treated overlay composition showing beaded and bonded fiber corresponding generally to the cross section arrangement shown in FIG. 1, in which sheath component (7A) of bicomponent fiber (1A) has been heat softened or melted, and has migrated, in part, along wettable core (6A), to form clumps or beads (5A) in response to a pre- or a post-lay down heating and working step carried out at a temperature equal to or exceeding the softening and melting point of the sheath component, but lower than that of wettable core (6A) or optional mono-component reinforcing fiber (2A). The clump or bead of sheath material (5A) cools to form bridges or interconnections with other exposed sheath-wettable bicomponent fiber core components (6A), and/or a corresponding wettable monocomponent (optional) reinforcing fiber or filament (2A), to form an extended mesh-like structure depending on the area of heating (not shown). The extent of sheath component migration and the structural nature of the clumps or beads is influenced not only by the general temperature range to which the overlay composition is initially subjected but also by the previously suggested post-lay down use of heated rollers or mandrels as well as the coarseness, amount, and position of aggregate (3A), the nature of other conventional components (4A), the general orientation of the reinforcing fiber, plus the wicking and wetting properties of the sheath material.

FIGS. 3A, 3B, and 3C are schematic top view representations of various optional patterned overlays 8A, 8B, 8C obtained by using an overlay composition and an overpress pattern within the scope of the instant invention, of which (8A) represents a feathered hot mix repair patch conventionally laid down and rolled into and over a base or pavement crack (9A), shown in phantom, at a temperature preferably below the softening or melting point of the sheath component of the admixed bicomponent reinforcing fiber (not shown), the applied pattern (10A) being conveniently applied thereafter at a desired angle and penetration through use of a heated roll or calendar (not shown) at a more easily controlled temperature within a range that is higher than the melting or softening point of the sheath of the bicomponent fiber but lower than the melting or softening point of the corresponding bicomponent fiber core, thereby heating and impressing a desired geometric pattern and binding reinforcing fiber within the patch to itself and to reinforcing fiber (if any) within surrounding undamaged surface. The applied pattern is smoothed, as desired, by use of a subsequent rolling or pressing step.

In FIG. 3B, a cold overlay composition shown as composition (8B) is conventionally laid down over an existing surface (7B) containing aggregate (3B). The overlay composition, as shown, has been cured and, heat imprinted (10B), using a desired pattern pressed at an angle (rather than perpendicular to the horizontal surface) for additional strength and possible increased surface holding purposes, using a heated calender, or roll (not shown) operating within a temperature range comparable to that above-described.

FIG. 3C demonstrates another possible imprint or pattern (10C) which is applied onto a hot or cold overlay composition (8C).

The present invention is further demonstrated, although not limited by the following examples and Table:

EXAMPLE I

Six hundred (600) grams of paving grade petroleum refiner grade asphalt is heated with twitinuous agitation in a blending kettle at 280° F. until melted and then slowly admixed with forty (40) grams of 0.5 inch polyethylene terephthalate/polypropylene sheath/core bicomponent staple[4].

[4] PET/PP 10 dpf bicomponent staple from

The kettle temperature is then slowly raised, with constant agitation, to 330° F.[5] and test tiles prepared by applying the mixed hot overlay composition onto a waxed release paper to a thickness of about 0.125", using the same troweling techniques and passes for each sample, and then applying a weighted 1 kilogram stainless steel roller operating at room temperature (3 passes), to obtain a thickness of 0.028"–0.031". The tile is then permitted to cool to room temperature. The resulting test tiles are then separated from their release papers and conventionally tested for tensile strength[6] using two separate test speeds. Test results are reported in Table I as T-1 and T-4 respectively.

[5] (sheath melting point about 305° F.)
[6] using model 1122 Instron Universal testing device marketed by Instron Corporation.

EXAMPLE II (Control)

Example I is repeated except that the kettle temperature is maintained throughout at 280° F., leaving the bicomponent fiber sheath component intact. The tile is then separated from its release papers and tested as in Example I, using two test speeds the results being reported in Table I as T-2 and T-5 respectively.

EXAMPLE III

Example I is repeated, but using the same weight of a 4 dpf polypropylene monofilament 0.5" staple having a sheath melting point of 320° F. at a kettle temperature of 280° F.

The resulting tiles are tested as before and test results reported as T-3 and T-6 in Table I.

TABLE I

| SAMPLE NUMBER | Fiber Length | DPF | Sample Preparation Conditions Temp. F. | Instron Crossed speed in./min | Sheet Thickness | TENSILE PROPERTIES | |
|---|---|---|---|---|---|---|---|
| | | | | | | Strength lbs/in | Strength PSI |
| T1 | 0.5 | 10 | 330 | 20 | 0.031 | 5.9 | 190 |
| T2 | 0.4 | 10 | 280 | 20 | 0.028 | 4.5 | 135 (control) |
| T3 | 0.5 | 4 | 280 | 20 | 0.028 | 3.7 | 132 |
| T4 | 0.5 | 10 | 330 | 5(*) | 0.031 | 3.3 | 118 |
| T5 | 0.5 | 10 | 280 | 5 | 0.028 | 2.4 | 86 (control) |
| T6 | 0.5 | 4 | 280 | 5 | 0.029 | 1.4 | 48 |

*run at slower speed.

I claim:

1. A method for improving the structural stability and durability of an overlay comprising:

(a) applying an effective amount of overlay composition to a base, the overlay composition comprising, in combination:

(A) a base component containing an asphalt-type material selected from the group consisting of asphalt, asphalt/rubber, rubber, acrylic copolymer, and asphate/acrylic copolymer;

(B) up to about 10 weight percent, by weight of said base component, of a water-soluble material;

(C) about 0.25–10 weight percent, by weight of said base component, of reinforcing fiber, about 25%–100% by weight of which is a bicomponent fiber comprising:
      (i) a first component containing polyolefin; and
      (ii) a second component which can be wet by said first component, said second component having a higher softening point and a higher melting point than said first component;

effective to favor softening or melting and migration of the first component about the second component;

(D) up to about 3000 weight percent aggregate material by weight of said base component;

(E) up to about 5 weight percent of a curing and thickening agent by weight of said base component; and (b) heating and working said overlay composition to favor softening or melting arid migration of the first component about the second component of said bicomponent reinforcing fiber within said overlay composition to form clumps or beads thereon.

2. The method of claim 1, wherein said overlay composition is preheated before working and lay down to a temperature exceeding the softening or melting point of said first component, but below the melting or softening point of the second component of said bicomponent reinforcing fiber within said overlay composition.

3. The method of claim 1 wherein said overlay composition is preheated to a temperature below the softening or melting point of said first component of said bicomponent reinforcing fiber and cured after working and lay down by heating the applied overlay in a predetermined pattern at a temperature exceeding the softening or melting point of the first component of said bicomponent reinforcing fiber but below the melting or softening point of the corresponding second component of said reinforcing fiber.

4. The method of claim 1 wherein the overlay composition comprises about 0.1%–10% by weight of reinforcing fiber about 25%–100% by weight of which is bicomponent staple fiber.

5. The method of claim 4 in which the sheath component of reinforcing fiber comprises a polyethyleneterephthalate.

6. The method of claim 4 in which the sheath component of reinforcing fiber comprises a polyolefin material.

7. The method of claim 4 in which the sheath component of reinforcing fiber comprises polypropylene/maleic anhydride.

8. The method of claim 4 in which the sheath component of reinforcing fiber comprises a polybutene material.

9. The method of claim 1 wherein the water soluble polymer material of the applied overlay composition comprises at least one member selected from the group consisting of a carboxymethyl cellulose, carboxymethyl hydroxyethyl cellulose, hydroxypropyl hydroxyethyl cellulose, and acrylic copolymer.

10. The method of claim 1 wherein the sheath component of the bicomponent reinforcing fiber of the applied overlay composition comprises a crystalline homopolymer or copolymer of polypropylene or polyethylene.

11. The method of claim 1 wherein the curing and thickening agent of the applied overlay composition comprises at least one of Portland cement, diatomaceous silica, lime or alum.

12. The method of claim 1 wherein the base component of the overlay composition comprises a ratio of asphalt-to-rubber of about 100–70 to 0–30 parts by weight.

13. The method of claim 1 wherein the base component of the overlay composition comprises a styrene/butadiene copolymer material.

14. The method of claim 1 wherein the step of heating and working said composition occurs coincident with said application.

15. The method of claim 1 wherein the step of heating and working said composition occurs subsequent to said application.

16. The method of claim 1 wherein the step of heating and working said composition occurs coincident with and subsequent to said application.

17. The method claim 1, wherein said bicomponent fiber has a core-shell geometry in which the core is comprised of the second component and the shell is comprised of the first component.

* * * * *